United States Patent [19]

Tabata et al.

[11] 4,084,098
[45] Apr. 11, 1978

[54] MOISTURE EXCHANGER TYPE OZONE-GENERATING APPARATUS

[75] Inventors: Norikazu Tabata; Takanori Ueno; Keisuke Namba, all of Amagasaki, Japan

[73] Assignee: Mitsubishi Denki Kabushiki Kaisha, Tokyo, Japan

[21] Appl. No.: 722,588

[22] Filed: Sep. 13, 1976

[30] Foreign Application Priority Data

Sep. 17, 1975    Japan .............................. 50-112339

[51] Int. Cl.² ............................................ C01B 13/11
[52] U.S. Cl. ...................................... 250/533; 204/176
[58] Field of Search ......................... 250/533; 204/176

[56] References Cited

U.S. PATENT DOCUMENTS

| | | | |
|---|---|---|---|
| 2,872,397 | 2/1959 | Kiffer | 250/533 |
| 3,663,418 | 5/1972 | Kawahata | 250/533 |

Primary Examiner—Benjamin R. Padgett
Assistant Examiner—Deborah L. Kyle
Attorney, Agent, or Firm—Oblon, Fisher, Spivak, McClelland & Maier

[57] ABSTRACT

A moisture exchanger type ozone-generating apparatus comprises one or more pairs of adsorption towers which alternatively repeat a step of adsorption and a step of desorption by passing a dry ozone-containing air, and at least one additional adsorption tower for imparting a step of partial desorption between the step of adsorption and the step of desorption, whereby the decrease of ozone concentration at the switching from the step of adsorption to the step of desorption is reduced.

1 Claim, 6 Drawing Figures

MOISTURE EXCHANGER TYPE OZONE-GENERATING APPARATUS

BACKGROUND OF THE INVENTION

The present invention relates to a moisture exchanger type ozone-generating apparatus which is equipped with an alternative switching type moisture exchanger.

FIG. 1 is a flow system diagram of the conventional moisture exchanger type ozone-generating apparatus.

In FIG. 1, the reference 1 designates a blower, 2-1, 2-2 designate adsorption towers in which an adsorbent such as silica gel is filled; 3-11 to 3-24 designate electromagnetic valves; 4 designates an ozone generator and 5 designates flow resistance.

The operation of the conventional apparatus of FIG. 1 will be illustrated.

The condition that the adsorption tower 2-1 is in a step of air-drying and the adsorption tower 2-2 is in a step of adsorbent-recovery will be illustrated. The electromagnetic vavles 3-11, 3-13, 3-22, 3-24 are opened and the other valves are closed.

A wet raw air compressed by the blower 1 is passed through the electromagnetic valve 3-11 into the adsorption tower 2-1 wherein moisture is adsorbed to form a dry air and the dry air is fed through the electromagnetic valve 3-13 to the ozone generator 4. When the dry air is passed through the ozone generator 4, a part of oxygen is ozonized by the silent discharge. If moisture is incorporated in the air, the amount of ozone generated, is decreased to cause corrosion of the ozone generator 4. Accordingly, it is necessary to use the dry air. The dry ozone-containing air is passed through the flow resistance 5 to reduce the pressure and is passed through the electromagnetic valve 3-24 to the adsorption tower 2-2, wherein the adsorbent is recovered. The dry ozone-containing air is converted to wet ozone-containing air and the wet ozone-containing air is passed through the electromagnetic valve 3-22 to the part for application of ozone.

When the adsorption function of the adsorbent in the adsorption tower 2-1 is reduced, the electromagnetic valves 3-12, 3-14, 3-21, 3-23 are opened and the electromagnetic valves 3-11, 3-13, 3-22, 3-24 are closed whereby the adsorption tower 2-2 is switched to the step of air-drying and the adsorption tower 2-1 is switched to the step of adsorbent-recovery That is, the adsorption towers 2-1, 2-2 alternatively repeat the moisture adsorption and adsorbent recovery to attain the function as the moisture exchanger.

When silica gel is used as the adsorbent, the dry ozone-containing air is passed through the adsorption tower, the decomposition of ozone in the step of forming the wet ozone-containing air is quite small to be no trouble. In the apparatus of FIG. 2, the electromagnetic valves 3-11, 3-14, 3-21 3-24 of FIG. 1 are replaced to the check valves 3-11', 3-14', 3-21', 3-24' and the other parts are same with those of FIG. 1. The function is also same with that of FIG. 1.

The characteristics of the ozone generation of the conventional apparatus shown in FIGS. 1 and 2, are shown in FIG. 3.

In FIG. 3, the reference $C_1$ designates the ozone concentration in the dry ozone-containing air ($C_1$ sampling in FIG. 1) discharged from the ozone generator.

The reference $C_2$ designates the ozone concentration in the wet ozone-containing air ($C_2$ sampling in FIG. 1) discharged from the adsorption tower.

The decomposition of ozone in the adsorption tower is not substantially found. Accordingly, $C_2$ is same with $C_1$ in the normal condition, however, $C_2$ is temporarily decreased to zero at the step of switching the adsorption tower. When silica gel is used as the adsorbent, silica gel adsorbs about 0.002 wt.% of ozone (at ozone concentration of 12 g/m$^3$) at room temperature. When the dry ozone-containing air is passed to the silica gel which was used for air-drying, by switching the valves, $C_2$ is decreased until the saturation of the ozone adsorption in the silica gel.

On the other hand, when the silica gel which adsorbed ozone at the recovery, is used for air-drying, at the beginning, the ozone adsorbed in the silica gel is desorbed to incorporate the ozone in the dry raw air to increase $C_1$.

As stated above, the disadvantage of the conventional apparatus is to suddenly decrease the ozone concentration in the wet ozone-containing air as shown in FIG. 3 even though the period is short at the switching operation of valves.

SUMMARY OF THE INVENTION

It is an object of the present invention to provide a moisture exchanger type ozone-generating apparatus wherein the sudden decrease of the ozone concentration at the switching of valves is reduced by adding at least one additional adsorption tower.

DESCRIPTION OF THE PREFERRED EMBODIMENTS

Figure 1:
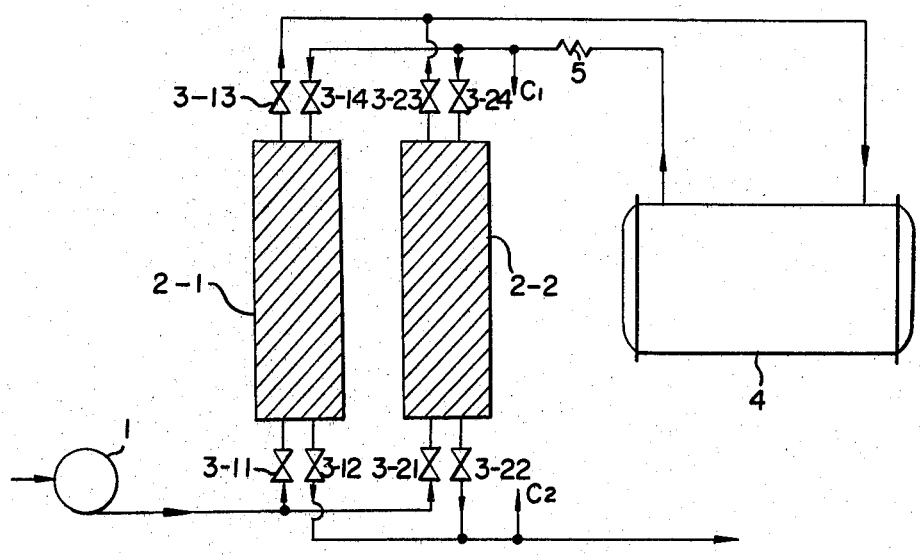
FIG. 1 shows a flow system of one embodiment of the conventional moisture exchanger type ozone-generating apparatus.
Figure 2:
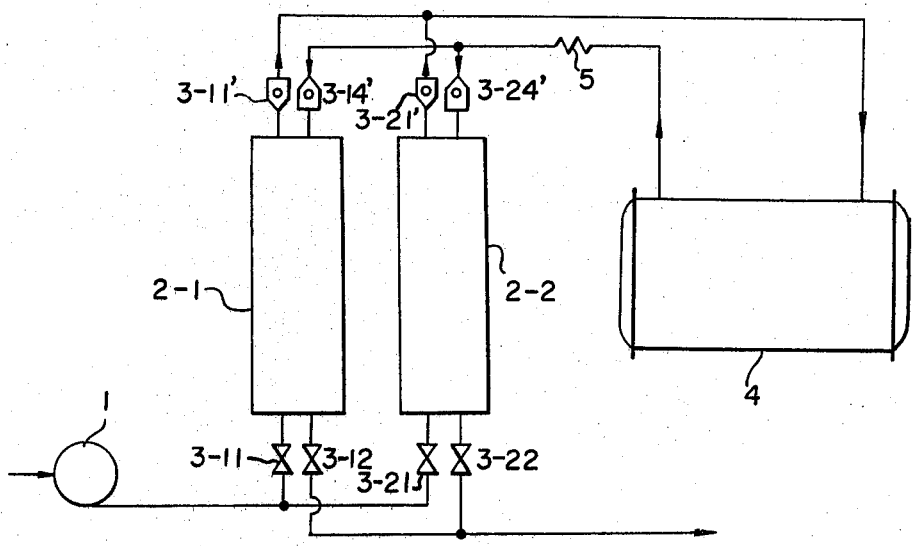
FIG. 2 shows a flow system of the other embodiment of the conventional apparatus.
Figure 4:
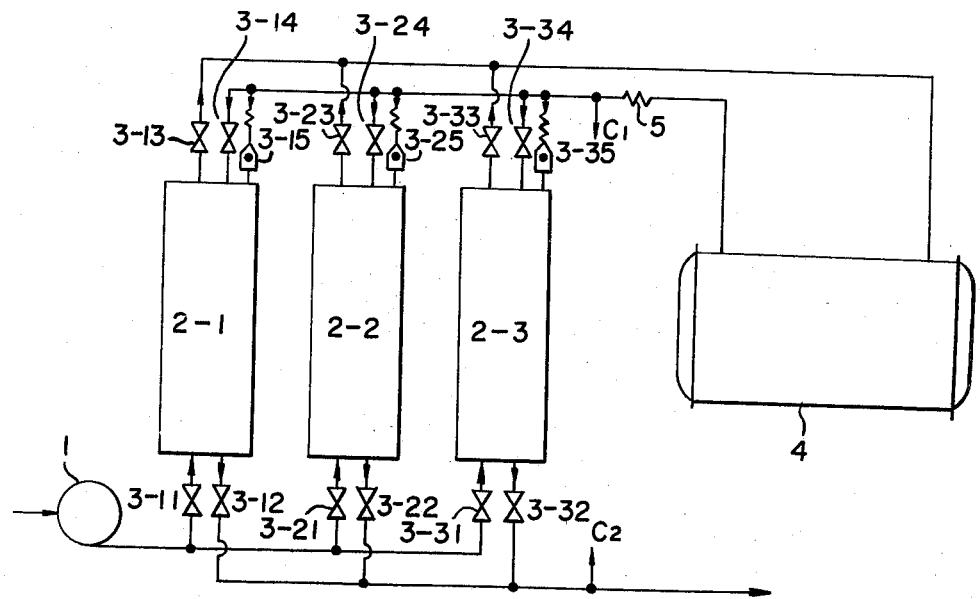
FIG. 4 shows a flow system of one embodiment of the moisture exchanger type ozone-generation apparatus of the invention.

FIG. 4 shows a flow system of one embodiment of the moisture exchanger type ozone-generating apparatus of the invention. The same reference numerals designate identical or corresponding parts in FIG. 1.

The reference 2-3 designates an additional adsorption tower, and 3-31, 3-32, 3-33, 3-34 designate electromagnetic valves and 3-15, 3-25, 3-35 designate check valves which are respectively connectd in series to each flow resistance.

Figure 5:
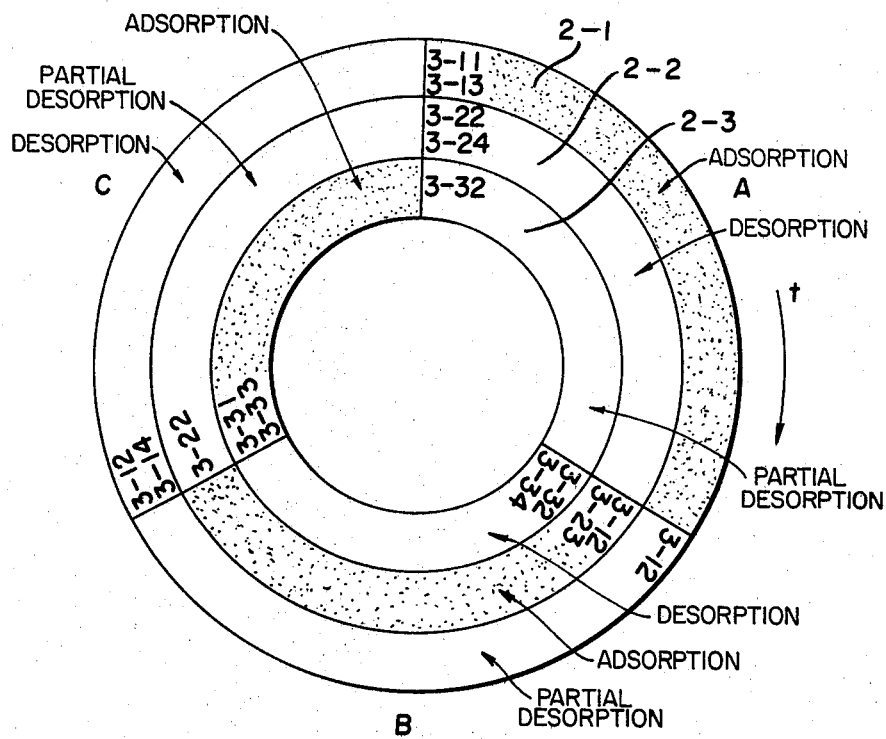
FIG. 5 shows sequence of operations of adsorption towers.

FIG. 5 shows sequence of operations of the adsorption towers which repeat the steps of the moisture adsorption (air-drying) the partial moisture desorption and the moisture desorption (recovery of adsorbent).

In FIG. 5, the numerals of the electromagnetic valves in the open state corresponding to each step are shown. The electromagnateic valves whose numerals are not shown, are in the close state.

Referring the FIGS. 4 and 5, the operation of the apparatus will be illustrated.

It is considered that the adsorption tower 2-1 is in the step of adsorption and the adsorption tower 2-2 is in the step of desorption and the adsorption tower 2-3 is in the step of partial desorption at the stage of FIG. 5A. In the stage, the wet raw air fed from the blower 1 is passed through the electromagnetic valve 3-11 to the adsorption tower 2-1 wherein it is dried to form a dry air. The dry air is passed through the electromagnetic valve 3-13 to the ozonizer 4 to form a dry ozone-containing air.

Most of the dry ozone-containing air (about 90%) is passed through the electromagnetic valves 3-24 to the adsorption tower 2-2 to recover the adsorbent in the adsorption tower 2-2, and the wet ozone-containing air is fed to the part for applying ozone. A part of the dry ozone-containing air is passed through the check valve 3-25 to the adsorption tower 2-3 wherein the adsorbent is partially desorbed and the air is fed through the electromagnetic valve 3-32 to the part for applying ozone.

In the adsorption tower 2-3 in the step of partial desorption, ozone is not adsorbed into the adsorbent because the previous step is in the moisture adsorbing condition (air-drying).

If the adsorption tower 2-3 is directly switched to the step of desorption, the ozne concentration is decreased until saturating the adsorbent to the ozone adsorption equilibrium.

Accordingly, the step of partial desorption is for adsorbing ozone into the adsorbent by passing a part of the dry ozone-containing air.

When ozone is adsorbed into the adsorbent in the step of partial desorption, the decrease of the ozone concentration at the beginning of the next step of desorption can be prevented.

Figure 6:
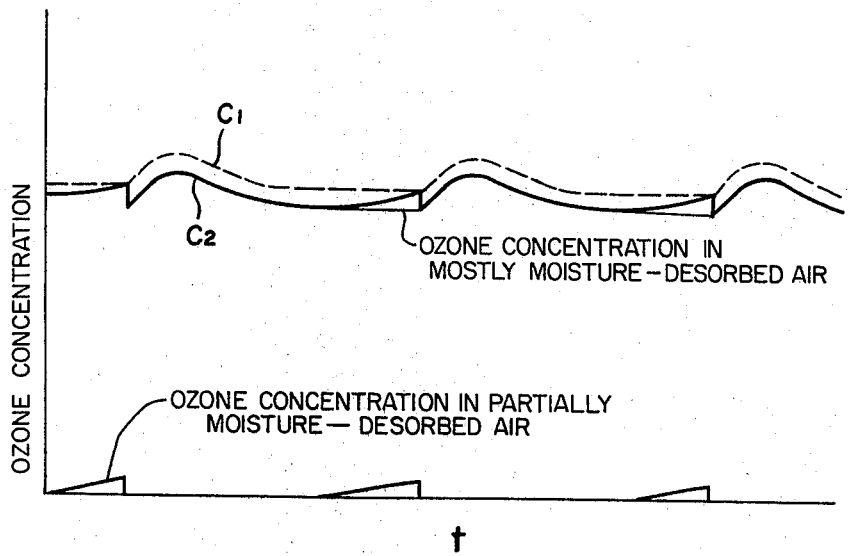
FIG. 6 is a graph showing characteristics of the ozone generation of the apparatus of the invention.

FIG. 6 shows characteristics of the ozone generation of the apparatus of FIG. 4.

Figure 3:
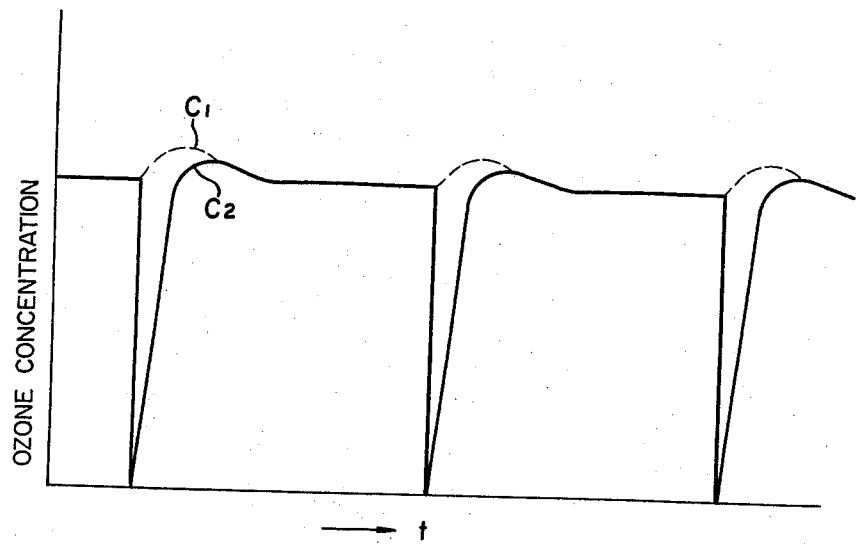
FIG. 3 is a graph showing characteristics of the ozone generation of the conventional apparatus.

It is clearly understood that the characteristics of FIG. 6 are remarkably improved comparing with those of FIG. 3. In FIG. 6, about 5% of the dry ozone-containing air is passed for the partial desorption. The rate of the dry ozone-containing air for the partial desorption can be selected in a range of 3 to 10% from the viewpoint of switching operations.

The electromagnetic valves can be replaced to the check valves 3-15, 3-25, 3-35 of FIG. 4. The electromagnetic valves 3-13, 3-23, 3-33 can be also replaced to the check valves. In the above-mentioned embodiment, one adsorption tower is added to the two adsorption tower system. Thus, it is possible to add a plurality of adsorption towers to the plural pairs of adsorption towers.

In the case, the decrease of the ozone concentration at the switching time can be further reduced by shifting the cycle for switching the pairs of adsorption towers for the time given by dividing each cycle by number of the pairs of adsorption towers.

As stated above, in accordance with the invention, at least one of adsorption tower is added to give the step of partial desorption between the step of adsorption (air-drying) and the step of desorption (recovery of adsorbent) whereby the sudden decrease of the ozone concentration at the switching time is prevented.

In the application of ozone, the remarkable decrease of ozone concentration causes trouble even though it is for short time. The invention is to overcome the disadvantage and to give remarkable effect in practical application.

What is claimed is:

1. A moisture exchange type ozone-generating apparatus comprising:
    an ozonizer,
    a moisture exchanger comprising at least three adsorption towers filled with adsorbent,
    means for passing a wet raw air through one of the adsorption towers in an adsorption step to dry the air,
    means for passing the dry air through the ozonizer to form a dry ozone-containing air,
    means for passing most of the dry ozone-containing air through a second adsorption tower which has previously been saturated with moisture in a desorption step to regenerate the adsorbent,
    means for passing the remainder of the dry ozone-containing air through a third adsorption tower which has previously been saturated with moisture in a partial desorption step to saturate the adsorbent, with adsorbed ozone and
    means for sequentially operating the adsorption towers in the order of adsorption step — partial desportion step — desorption step with an alternate switching operation.

* * * * *